US012261004B2

(12) United States Patent
Otsuka et al.

(10) Patent No.: US 12,261,004 B2
(45) Date of Patent: Mar. 25, 2025

(54) ELECTROMAGNETIC RELAY

(71) Applicant: OMRON Corporation, Kyoto (JP)

(72) Inventors: Kohei Otsuka, Kyoto (JP); Ayata Horie, Kyoto (JP); Hiroyuki Iwasaka, Kyoto (JP); Ryota Minowa, Kyoto (JP); Shinichi Ogawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/202,952

(22) Filed: May 29, 2023

(65) Prior Publication Data

US 2023/0395346 A1 Dec. 7, 2023

(30) Foreign Application Priority Data

Jun. 2, 2022 (JP) ................................ 2022-090146

(51) Int. Cl.
*H01H 50/02* (2006.01)

(52) U.S. Cl.
CPC .................................. *H01H 50/02* (2013.01)

(58) Field of Classification Search
CPC ...................................................... H01H 50/02
USPC .................................................. 335/202, 131
See application file for complete search history.

(56) References Cited

U.S. PATENT DOCUMENTS 4,459,445 A * 7/1984 Hisatsune ................ H01H 9/46 200/304
4,516,005 A * 5/1985 Gallatin ................... H01H 9/44 335/201
4,901,045 A * 2/1990 Eley ..................... H01H 71/145 337/140
5,359,161 A * 10/1994 Leach .................... H01H 1/225 267/158
7,948,339 B2 * 5/2011 Burger ................. H01H 50/305 335/131
8,575,509 B2 * 11/2013 Marchand ............ H01H 33/664 218/126

(Continued)

FOREIGN PATENT DOCUMENTS

JP 2017-79109 A 4/2017
JP 2020-27729 A 2/2020

OTHER PUBLICATIONS

The Office Action for the corresponding Korean application No. 10-2023-66939, issued on Nov. 8, 2024.

*Primary Examiner* — Alexander Talpalatski
(74) *Attorney, Agent, or Firm* — SHINJYU GLOBAL IP

(57) ABSTRACT

An electromagnetic relay includes a fixed terminal, a fixed contact, a movable contact, a movable contact piece, and a dust collecting mechanism. The fixed contact is connected to the fixed terminal. The movable contact faces the fixed contact. The movable contact piece is connected to the movable contact. The movable contact piece is movable between a closed position at which the movable contact is in contact with the fixed contact and an open position at which the movable contact is separated from the fixed contact. The dust collecting mechanism is disposed adjacent to the fixed contact and the movable contact. The dust collecting mechanism generates a second negative pressure greater than a first negative pressure generated between the fixed contact and the movable contact when the movable contact piece moves from the closed position to the open position.

8 Claims, 15 Drawing Sheets

(56) References Cited

U.S. PATENT DOCUMENTS

| | | | | |
|---|---|---|---|---|
| 8,841,979 | B2 * | 9/2014 | Uchida .................. | H01H 53/02 335/131 |
| 8,901,445 | B2 * | 12/2014 | Tachikawa ............... | H01H 9/40 335/201 |
| 2009/0096558 | A1 * | 4/2009 | Lange ................ | H01H 51/2209 335/131 |
| 2021/0304993 | A1 | 9/2021 | Otsuka et al. | |

* cited by examiner

ELECTROMAGNETIC RELAY

CROSS-REFERENCE TO RELATED APPLICATION

This application claims priority to Japanese Patent Application No. 2022-090146, filed Jun. 2, 2022. The contents of that application are incorporated by reference herein in their entirety.

FIELD

The present invention relates to an electromagnetic relay.

BACKGROUND

An electromagnetic relay includes a fixed terminal, a fixed contact, a movable contact, and a movable contact piece (see, for example, JP-A-2017-079109). The fixed contact is connected to the fixed terminal. The movable contact faces the fixed contact and is connected to the movable contact piece. The movable contact piece is movable between a closed position and an open position. When the movable contact piece is disposed at the closed position, the movable contact is in contact with the fixed contact. When the movable contact piece is at the open position, the movable contact is separated from the fixed contact.

SUMMARY

In the above electromagnetic relay, when the movable contact separates from the fixed contact, the volume of the space between the movable contact and the fixed contact increases. A negative pressure is thereby generated in the space between the movable contact and the fixed contact. This negative pressure causes the air around the movable contact and the fixed contact to flow toward the movable contact and the fixed contact. If the air contains foreign matter such as abrasion powder, the foreign matter flows together with the air toward the movable contact and the fixed contact. If the foreign matter adheres to the movable contact or the fixed contact, the stability of the contact that exists between the movable contact and the fixed contact when the movable contact is disposed at the closed position decreases. An object of the present invention is to suppress adhesion of foreign matter to a contact in an electromagnetic relay.

An electromagnetic relay according to one aspect of the present invention includes a fixed terminal, a fixed contact, a movable contact, a movable contact piece, and a dust collecting mechanism. The fixed contact is connected to the fixed terminal. The movable contact faces the fixed contact. The movable contact piece is connected to the movable contact. The movable contact piece is movable between a closed position at which the movable contact is in contact with the fixed contact and an open position at which the movable contact is separated from the fixed contact. The dust collecting mechanism is disposed adjacent to the fixed contact and the movable contact. The dust collecting mechanism generates a second negative pressure greater than a first negative pressure generated between the fixed contact and the movable contact when the movable contact piece moves from the closed position to the open position.

In the electromagnetic relay according to the present aspect, when the movable contact piece moves from the closed position to the open position, the second negative pressure, which is larger than the first negative pressure generated between the fixed contact and the movable contact, is generated by the dust collecting mechanism. Therefore, air around the fixed contact and the movable contact is guided to the dust collecting mechanism. This prevents foreign matter contained in the air from adhering to the movable contact or the fixed contact.

The dust collecting mechanism may include a fixed portion and a movable portion. The fixed portion may include a first surface. The movable portion may include a second surface facing the first surface. The movable portion may be connected to the movable contact piece. When the movable contact piece moves from the closed position to the open position, a second volume change amount of a second space between the first surface and the second surface may be greater than a first volume change amount of a first space between the fixed contact and the movable contact. In this case, since the second volume change amount in the dust collecting mechanism is greater than the first volume change amount between the fixed contact and the movable contact, the dust collecting mechanism generates the second negative pressure larger than the first negative pressure.

The first surface may have a surface area greater than a surface area of the fixed contact. In this case, since the surface area of the first surface is greater than the surface area of the fixed contact, the second volume change amount becomes greater than the first volume change amount.

The second surface may have a surface area greater than a surface area of the movable contact. In this case, since the surface area of the second surface is greater than the surface area of the movable contact, the second volume change amount becomes greater than the first volume change amount.

The second surface may separate from the first surface before the movable contact separates from the fixed contact when the movable contact piece moves from the closed position to the open position. In this case, foreign matter is guided to the dust collecting mechanism before the movable contact separates from the fixed contact. As a result, a high dust collection effect can be obtained in the beginning of the movement of the movable contact piece from the closed position to the open position.

The second surface may separate from the first surface after the movable contact separates from the fixed contact when the movable contact piece moves from the closed position to the open position. In this case, after the movable contact separates from the fixed contact, foreign matter is guided to the dust collecting mechanism. As a result, a high dust collection effect is obtained at the final stage of movement of the movable contact piece from the closed position to the open position.

The fixed portion may be supported by an elastic member. The movable portion may be supported by an elastic member. In this case, the movable portion can be easily brought into contact with the fixed portion.

DETAILED DESCRIPTION

Figure 1:
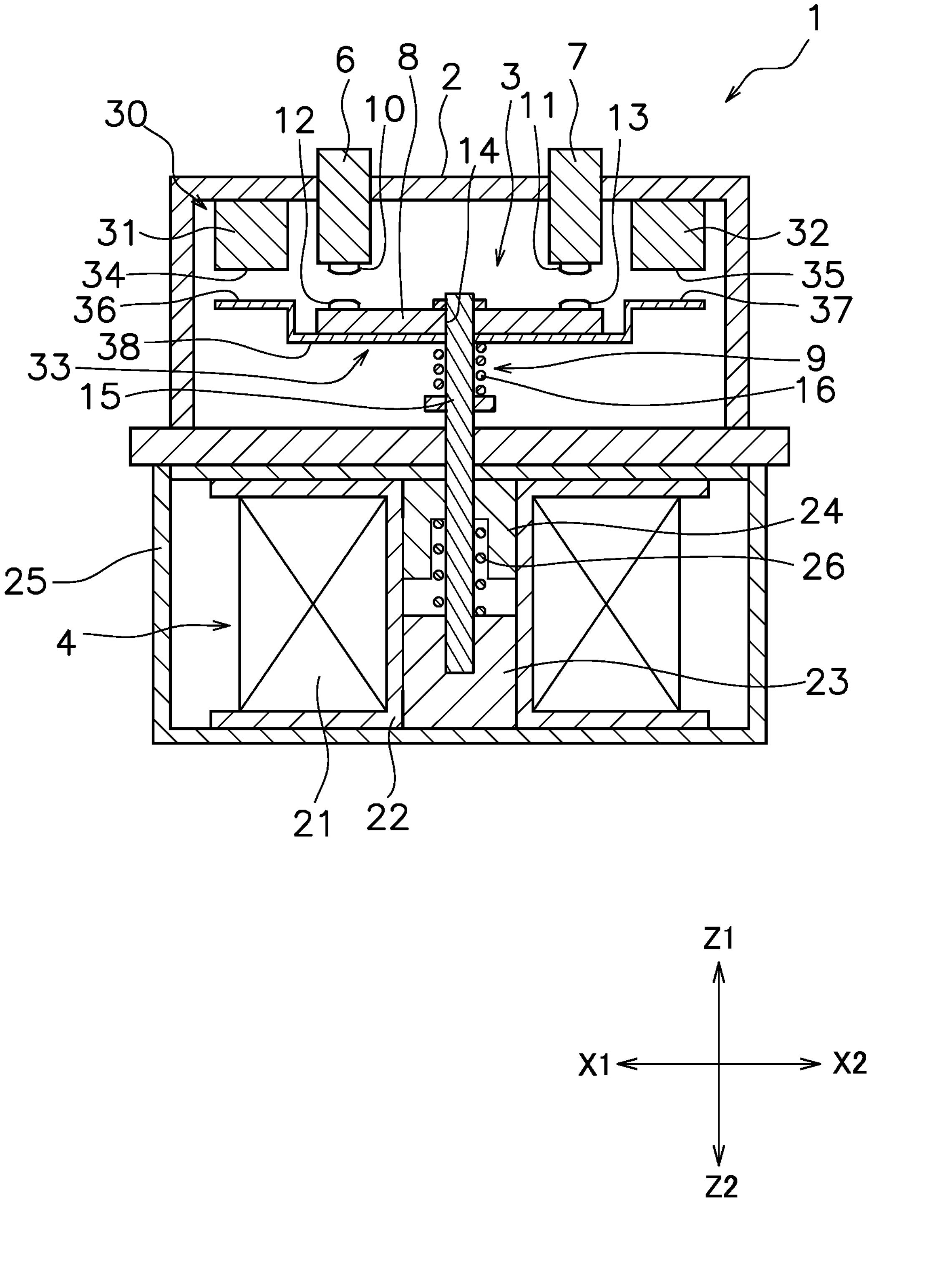
FIG. 1 is a cross-sectional view of an electromagnetic relay in an open state.

An electromagnetic relay according to an exemplary embodiment of the claimed invention will be described below with reference to the drawings. FIG. 1 is a cross-sectional view of an electromagnetic relay 1 according to an exemplary embodiment. As shown in FIG. 1, the electromagnetic relay 1 includes a case 2, a contact device 3, and a drive device 4. The case 2 is made of an insulating material such as resin or ceramic. The contact device 3 is accommodated in the case 2. The contact device 3 includes a first fixed terminal 6, a second fixed terminal 7, a movable contact piece 8, a movable mechanism 9, a first fixed contact 10, a second fixed contact 11, a first movable contact 12, and a second movable contact 13.

In the following description, the direction in which the first fixed contact 10 and the first movable contact 12 face each other are defined as a moving direction (Z1, Z2). The movement direction (Z1, Z2) include a contact direction (Z1) and an open direction (Z2). The direction in which the movable contacts 12 and 13 approach the fixed contacts 10 and 11 is defined as the contact direction (Z1). The direction in which the movable contacts 12 and 13 separate from the fixed contacts 10 and 11 is defined as the open direction (Z2).

The direction in which the movable contact piece 8 extends is defined as the longitudinal direction (X1, X2). The longitudinal direction (X1, X2) is the direction perpendicular to the movement direction (Z1, Z2). The longitudinal direction (X1, X2) includes a first longitudinal direction (X1) and a second longitudinal direction (X2). The second longitudinal direction (X2) is opposite to the first longitudinal direction (X1). A direction from the second fixed contact 11 to the first fixed contact 10 is defined as the first longitudinal direction (X1). A direction from the first fixed contact 10 to the second fixed contact 11 is defined as the second longitudinal direction (X2).

Figure 5:
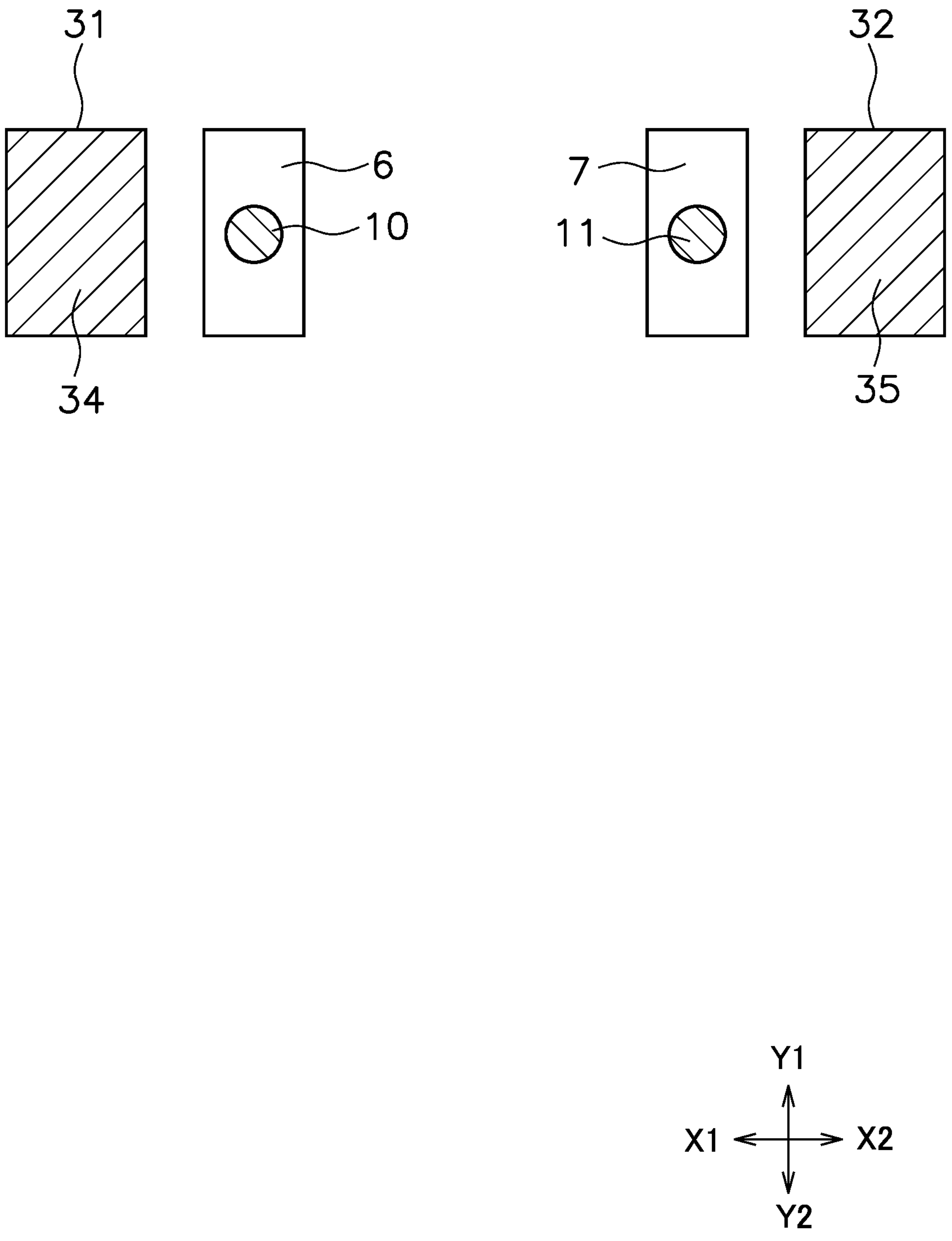
FIG. 5 is a plan view of first and second fixing portions and first and second fixed terminals.

As shown in FIG. 5, the direction perpendicular to the movement direction (Z1, Z2) and the longitudinal direction (X1, X2) is defined as a lateral direction (Y1, Y2). The lateral direction (Y1, Y2) include a first lateral direction (Y1) and a second lateral direction (Y2). The second lateral direction (Y2) is opposite to the first lateral direction (Y1).

The first fixed terminal 6, the second fixed terminal 7, the movable contact piece 8, the first fixed contact 10, the second fixed contact 11, the first movable contact 12, and the second movable contact 13 are made of an electrically conductive material. For example, the first fixed terminal 6, the second fixed terminal 7, and the movable contact piece 8 are made of a metal known as a terminal material such as a copper-based metal. However, the first fixed terminal 6, the second fixed terminal 7, and the movable contact piece 8 may be made of materials different from these materials. The first fixed contact the second fixed contact 11, the first movable contact 12, and the second movable contact 13 are made of metal known as a contact material such as copper-based metal or silver-based metal.

The first fixed terminal 6 and the second fixed terminal 7 are disposed apart from each other in the longitudinal direction (X1, X2). The first fixed terminal 6 and the second fixed terminal 7 protrude from inside the case 2 to the outside of the case 2. The first fixed contact 10 is connected to the first fixed terminal 6. The second fixed contact 11 is connected to the second fixed terminal 7. The first fixed contact 10 and the second fixed contact 11 are disposed inside the case 2.

The movable contact piece 8, the first movable contact 12, and the second movable contact 13 are disposed inside the case 2. The first movable contact 12 and the second movable contact 13 are connected to the movable contact piece 8. The first movable contact 12 faces the first fixed contact 10. The second movable contact 13 faces the second fixed contact 11. The first movable contact 12 is disposed apart from the second movable contact 13 in the longitudinal direction (X1, X2).

Figure 2:
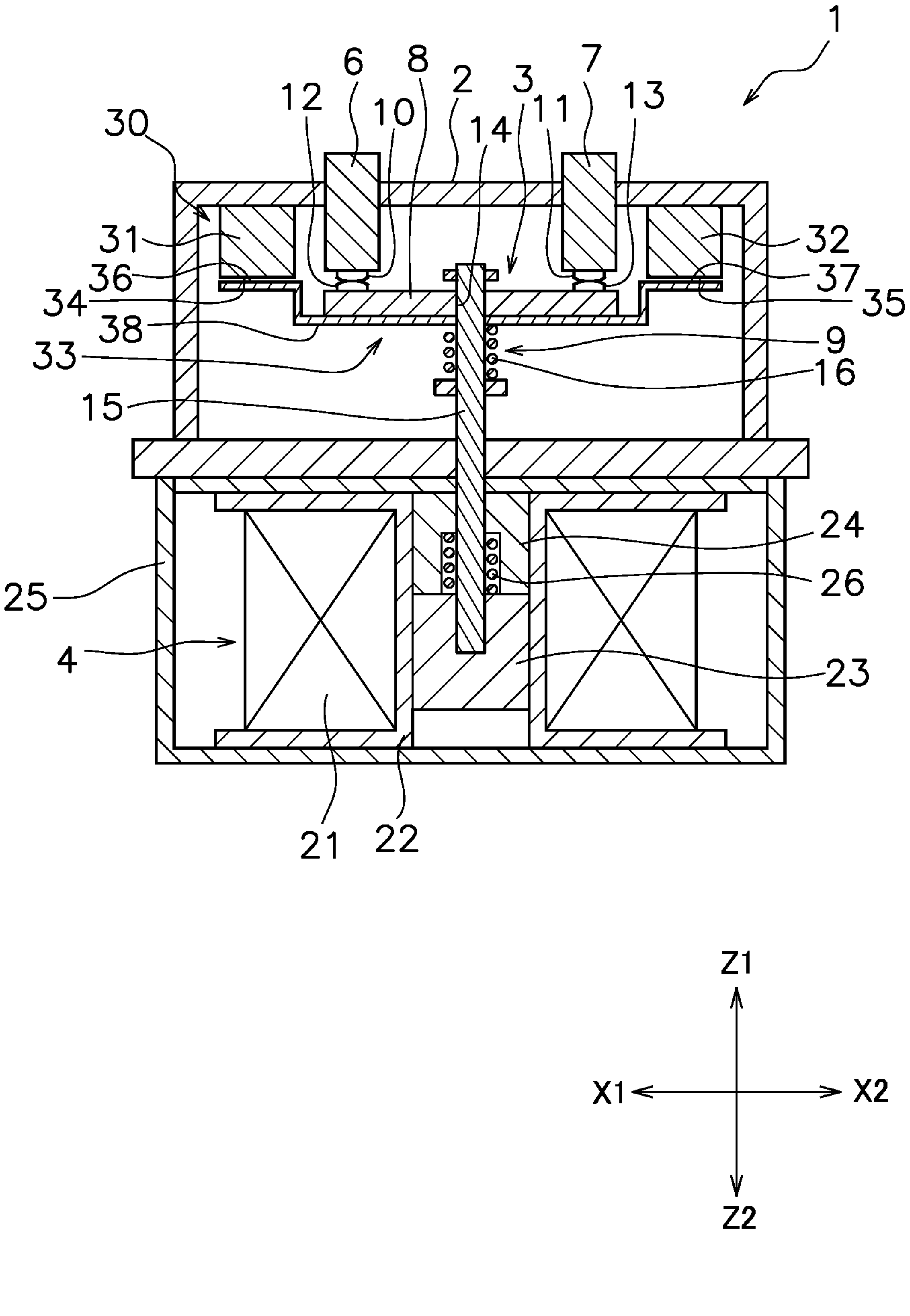
FIG. 2 is a cross-sectional view of the electromagnetic relay in a closed state.

The movable contact piece 8 is movable in the movement direction (Z1, Z2). The movable contact piece 8 is movable between an open position shown in FIG. 1 and a closed position shown in FIG. 2. As shown in FIG. 1, when the movable contact piece 8 is at the open position, the movable contacts 12 and 13 are separated from the fixed contacts 10 and 11. As shown in FIG. 2, when the movable contact piece 8 is at the closed position, the movable contacts 12 and 13 are in contact with the fixed contacts 10 and 11.

The movable mechanism 9 supports the movable contact piece 8. The movable mechanism 9 includes a drive shaft 15 and a contact spring 16. The drive shaft 15 is connected to the movable contact piece 8. The drive shaft 15 extends in the movement direction (Z1, Z2) and extends through the movable contact piece 8 in the movement direction (Z1, Z2). The drive shaft 15 is movable in the movement direction (Z1, Z2). The contact spring 16 biases the movable contact piece 8 in the contact direction (Z1).

As shown in FIGS. 1 and 2, the drive device 4 moves the drive shaft 15 in movement direction (Z1, Z2). The drive device 4 includes a coil 21, a spool 22, a movable iron core 23, a fixed core 24, a yoke 25, and a return spring 26. The drive device 4 moves the movable contact piece 8 between the open position and the closed position via the movable mechanism 9 by electromagnetic force. The coil 21 is wound around spool 22. The movable iron core 23 and the fixed core 24 are disposed in the spool 22. The movable iron core 23 is connected to the drive shaft 15. The movable iron core 23 is movable in the movement direction (Z1, Z2). The fixed core 24 is disposed to face the movable iron core 23. The return spring 26 biases the movable iron core 23 in the open direction (Z2).

In the electromagnetic relay 1, when the coil 21 is energized, the magnetic force of the coil 21 attracts the movable iron core 23 to the fixed core 24. Thereby, the movable iron core 23 and the drive shaft 15 move in the contact direction (Z1) against the biasing force of the return spring 26. Thereby, the movable contact piece 8 moves to the closed position shown in FIG. 2 and the movable contact 12 and 13 contact the fixed contacts 10 and 11, respectively.

After the movable contacts 12 and 13 initially make contact with the fixed contacts 10 and 11, the contact spring 16 is compressed by further movement of the drive shaft 15 in the contact direction (Z1). The distance that the drive shaft 15 moves further in the contact direction (Z1) from the position when the movable contacts 12 and 13 initially contact the fixed contacts 10 and 11 is defined as a contact follow.

When the coil 21 is de-energized, the movable iron core 23 and the drive shaft move in the open direction (Z2) by the biasing force of the return spring 26. As a result, the movable contact piece 8 returns to the open position shown in FIG. 1 and the movable contacts 12 and 13 separate from the fixed contacts 10 and 11, respectively.

As described above, when the movable contacts 12 and 13 separate from the fixed contacts 10 and 11, the volume of the space between the movable contacts 12 and 13 and the fixed contacts 10 and 11 increases. Thereby, a negative pressure is generated in the space between the movable contacts 12 and 13 and the fixed contacts 10 and 11. Due to this negative pressure, when the air around the movable contacts 12 and 13 and the fixed contacts 10 and 11 flows toward the movable contacts 12 and 13 and the fixed contacts 10 and 11, foreign matter that may be contained within the case can flow together with the air toward the movable contacts 12 and 13 and the fixed contacts 10 and 11. The electromagnetic relay 1 according to the present embodiment includes a dust collecting mechanism 30 for suppressing adhesion of foreign matter to the movable contacts 12 and 13 and the fixed contacts 10 and 11.

Figure 3:
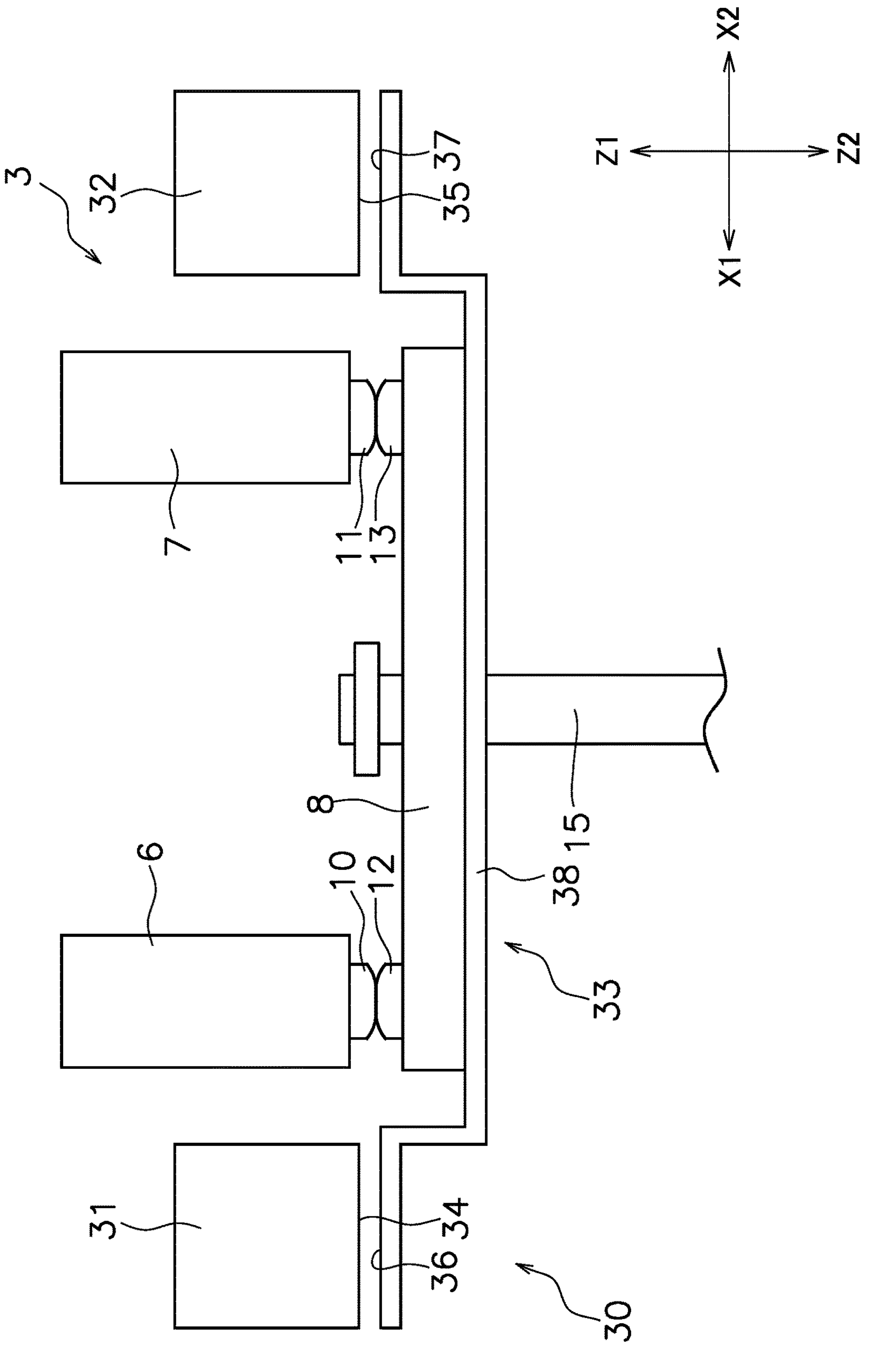
FIG. 3 is a diagram showing a contact device in the closed state.
Figure 4:
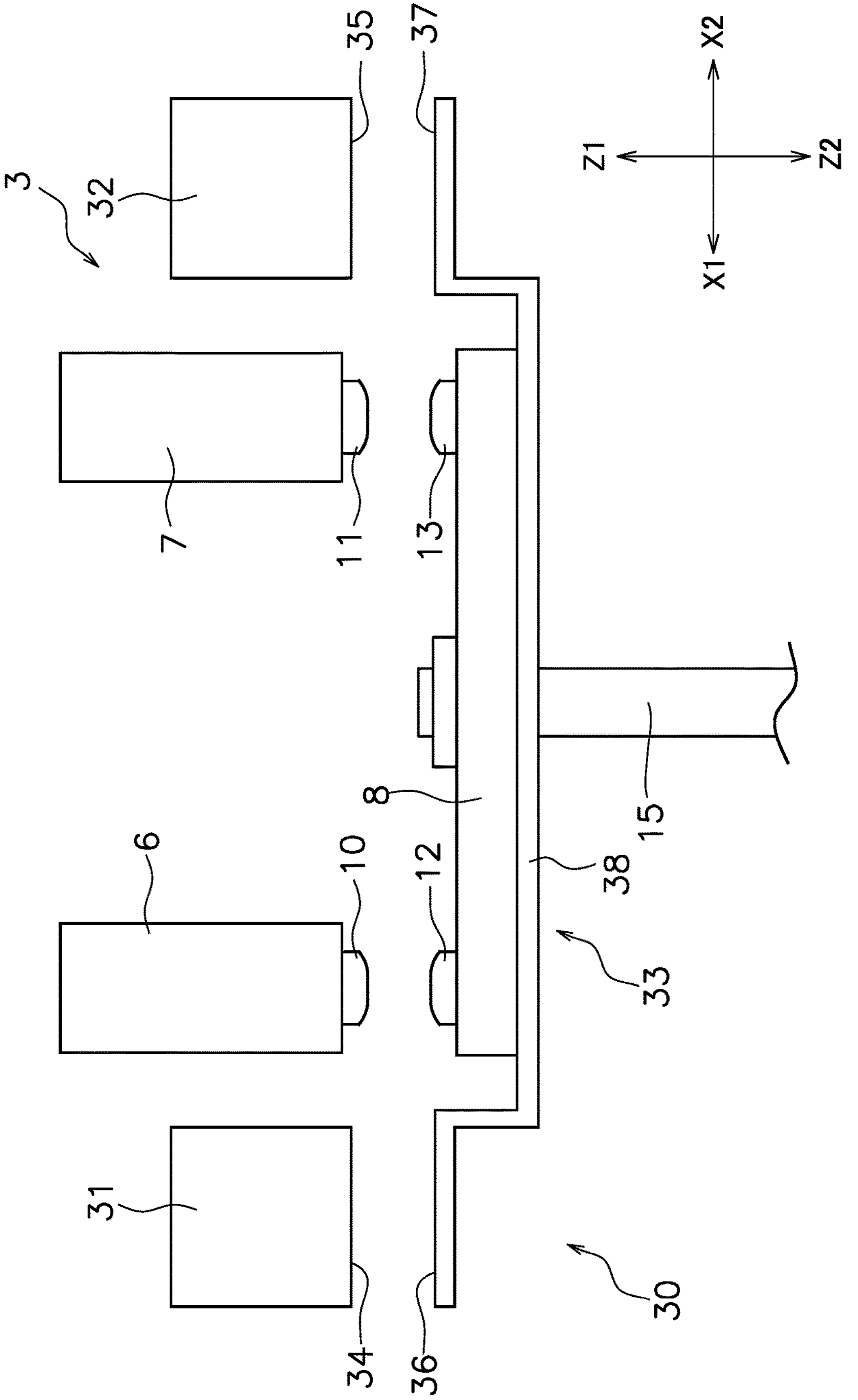
FIG. 4 is a diagram showing the contact device in the open state.

FIG. 3 shows the contact device 3 in the closed state. FIG. 4 shows the contact device 3 in the open state. As shown in FIGS. 3 and 4, the dust collecting mechanism 30 is disposed adjacent to the fixed contacts 10 and 11 and the movable contacts 12 and 13. The dust collecting mechanism 30 generates a second negative pressure that is greater (more negative) than a first negative pressure generated between the first fixed contact 10 and the first movable contact 12 when the movable contact piece 8 moves from the closed position to the open position. Thereby, the dust collecting mechanism 30 guides the air around the first fixed contact 10 and the first movable contact 12 to the dust collecting mechanism 30. Further, the dust collecting mechanism 30 generates a fourth negative pressure that is greater (more negative) than a third negative pressure generated between the second fixed contact 11 and the second movable contact 13 when the movable contact piece 8 moves from the closed position to the open position. Thereby, the dust collecting mechanism 30 guides the air around the second fixed contact 11 and the second movable contact 13 to the dust collecting mechanism 30. As a result, foreign matter is collected by the dust collecting mechanism 30.

Specifically, the dust collecting mechanism 30 includes a first fixed portion 31, a second fixed portion 32, and a movable portion 33. The first fixed portion 31 is fixedly disposed in the case 2. The first fixed portion 31 is disposed adjacent to the first fixed terminal 6. The first fixed portion 31 is disposed in the longitudinal direction with respect to the first fixed contact 10. The first fixed portion 31 is not electrically connected to the first fixed terminal 6. The first fixed portion 31 is made of resin, for example. Alternatively, the first fixed portion 31 may be made of metal. The first fixed portion 31 includes a first surface 34. The first surface 34 has a flat shape.

The second fixed portion 32 is fixedly disposed in the case 2. The second fixed portion 32 is disposed adjacent to the second fixed terminal 7. The second fixed portion 32 is disposed in the longitudinal direction (X1, X2) with respect to the second fixed contact 11. The second fixed portion 32 is not electrically connected to the second fixed terminal 7. The second fixed portion 32 is made of resin, for example. Alternatively, the second fixed portion 32 may be made of metal. The second fixed portion 32 includes a third surface 35. The third surface 35 has a flat shape.

The movable portion 33 is connected to the movable contact piece 8. The movable portion 33 moves together with the movable contact piece 8. Alternatively, the movable portion 33 may be connected to the drive shaft 15. In that case, the movable portion 33 moves together with the drive shaft 15. The movable portion 33 is made of resin, for example. Alternatively, the movable portion 33 may be made of metal. The movable portion 33 includes a second surface 36, a fourth surface 37, and a support portion 38. The second surface 36 faces the first surface 34 in the movement direction (Z1, Z2). The second surface 36 has a flat shape. The fourth surface 37 faces the third surface 35 in the movement direction (Z1, Z2). The fourth surface 37 has a flat shape.

Figure 6:
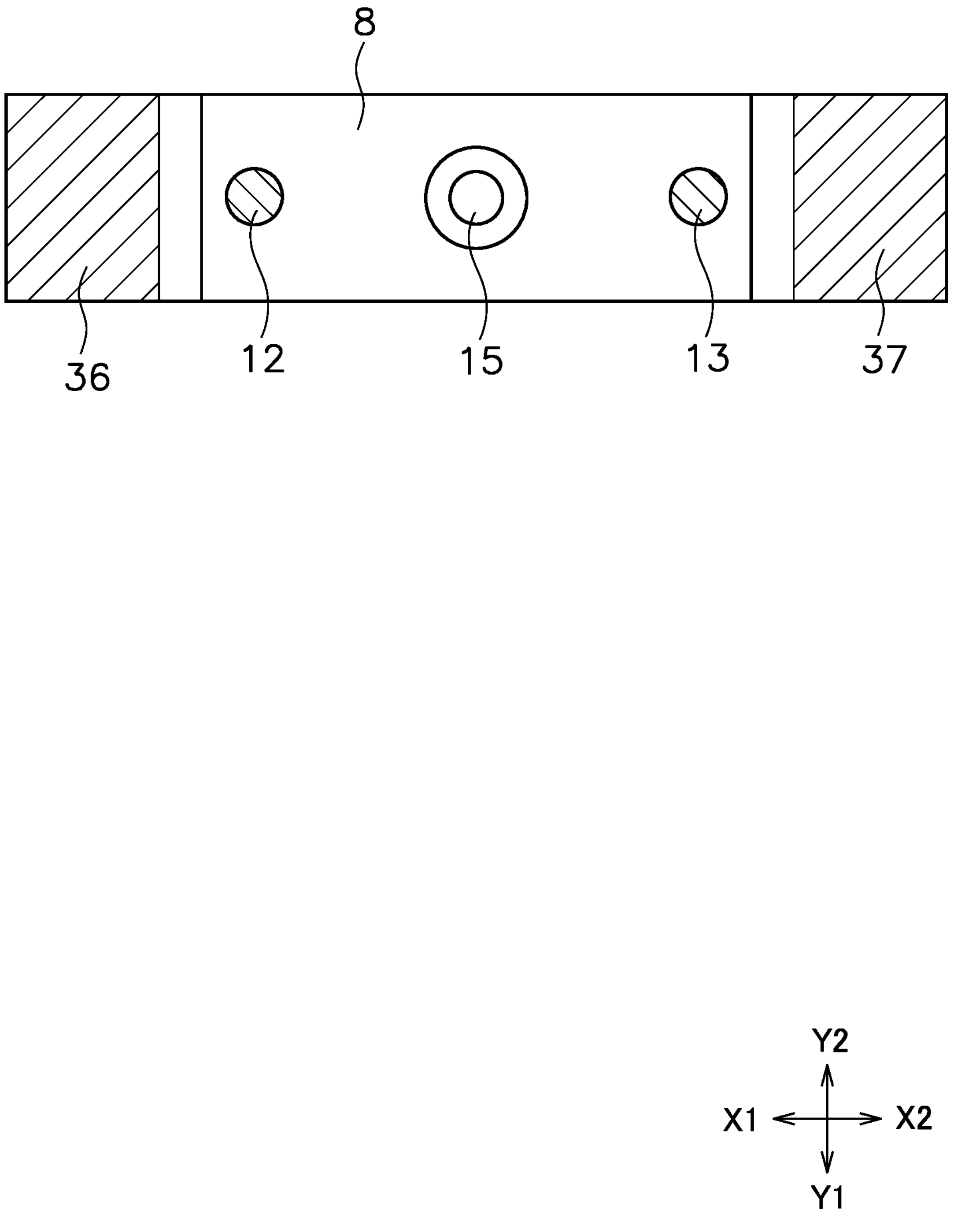
FIG. 6 is a plan view of a movable portion and a movable contact piece.

FIG. 5 is a plan view of the first and second fixed portions 31 and 32 and the first and second fixed terminals 6 and 7. As shown in FIG. 5, the first surface 34 has a surface area greater than that of the first fixed contact 10. The third surface 35 has a surface area greater than that of the second fixed contact 11. FIG. 6 is a plan view of the movable portion 33 and the movable contact piece 8. As shown in FIG. 6, the second surface 36 has a surface area greater than the surface area of the first movable contact 12. The fourth surface 37 has a surface area greater than that of the second movable contact 13. In FIGS. 5 and 6, hatching is given to the portions indicating the surface areas.

Figure 7:
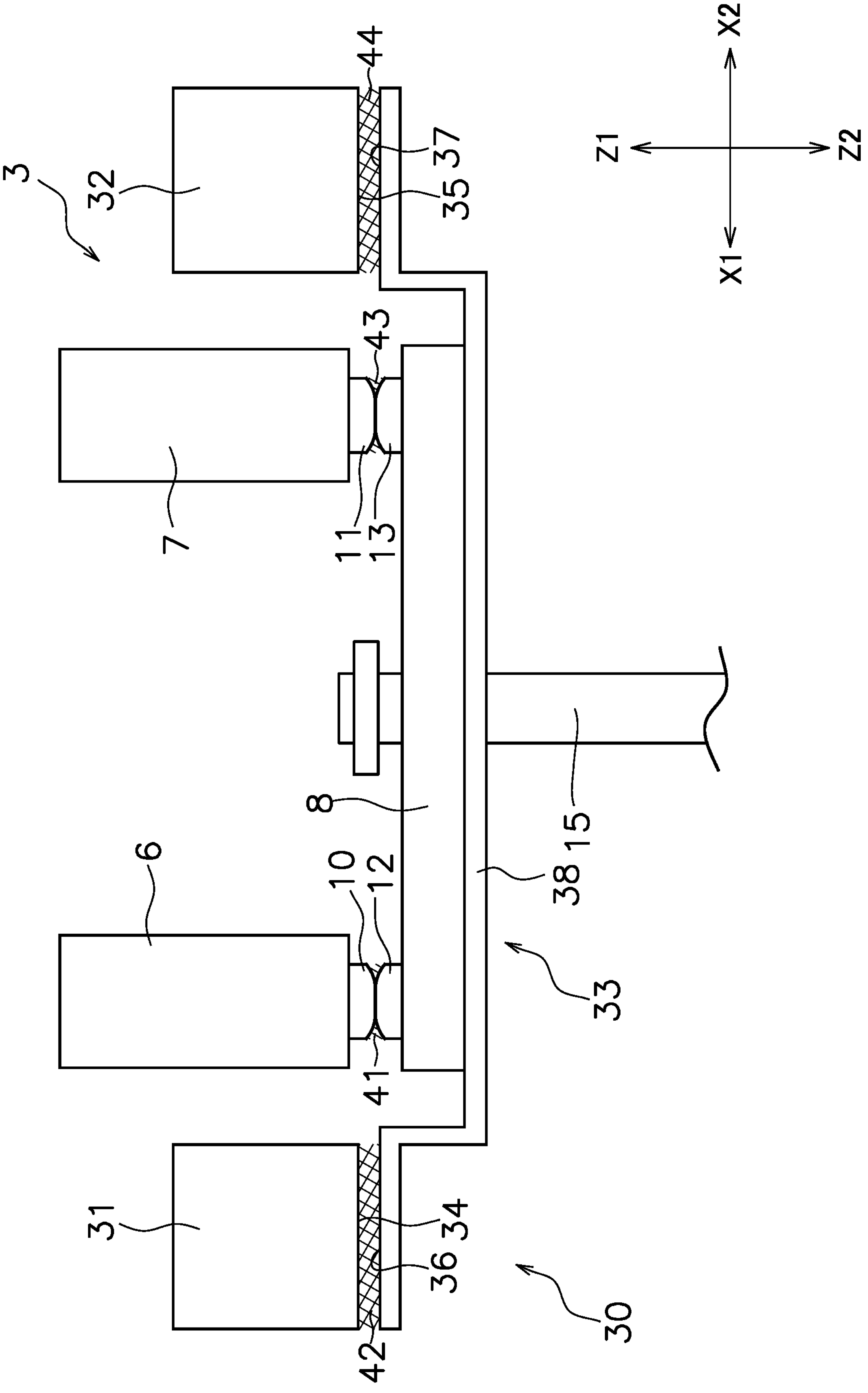
FIG. 7 is a diagram showing the contact device in the closed state.
Figure 8:
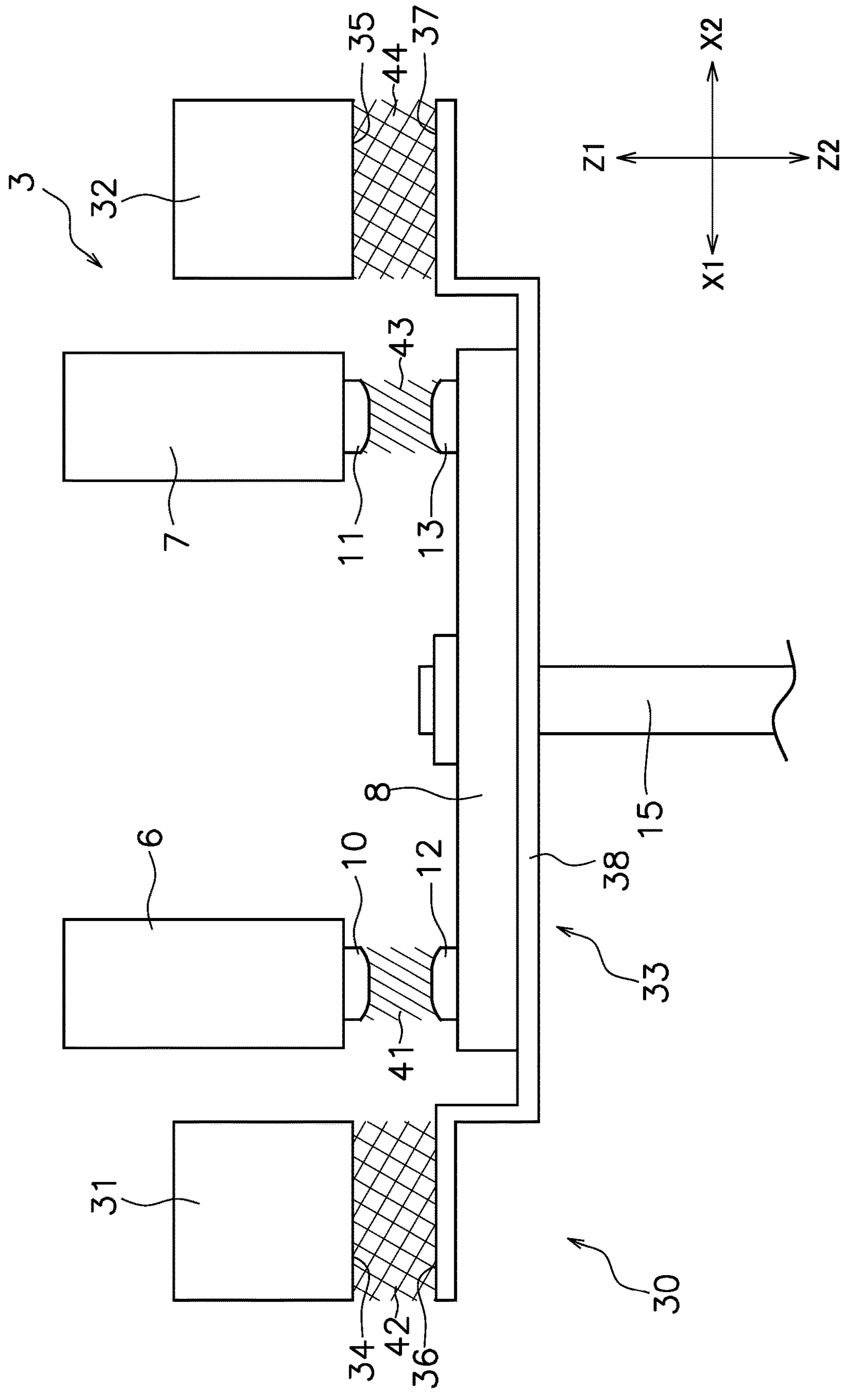
FIG. 8 is a diagram showing the contact device in the open state.

As shown in FIGS. 7 and 8, when the movable contact piece 8 moves from the closed position to the open position, the first space 41 between the first fixed contact 10 and the first movable contact 12 expands. A second space 42 between the first surface 34 and the second surface 36 expands. A third space 43 between the second fixed contact 11 and the second movable contact 13 expands. A fourth space 44 between the third surface 35 and the fourth surface 37 expands. In FIGS. 7 and 8, the first to fourth spaces 41-44 are hatched.

With the movable contact piece 8 at the closed position, as shown in FIG. 7, the second surface 36 is not in contact with the first surface 34 and is spaced apart from the first surface 34. With the movable contact piece 8 at the closed position, the fourth surface 37 is not in contact with the third surface 35 and is spaced apart from the third surface 35.

As shown in FIG. 7, the volume of the first space 41 between the first fixed contact 10 and the first movable contact 12 when the movable contact piece 8 is disposed at the closed position is defined as Vla. The volume of the second space 42 between the first surface 34 and the second surface 36 when the movable contact piece 8 is at the closed position is defined as V2*a*. As shown in FIG. 8, the volume of the first space 41 between the first fixed contact 10 and the first movable contact 12 when the movable contact piece 8 is at the open position is defined as V1*b*. The volume of the second space 42 between the first surface 34 and the second surface 36 when the movable contact piece 8 is at the open position is defined as V2*b*. In this case, the following formula (1) holds.

$$V2b-V2a>V1b-V1a \quad (1)$$

That is, when the movable contact piece 8 moves from the closed position to the open position, the second volume change amount (V2*b*−V2*a*) of the second space 42 is greater than the first volume change amount (V1*b*−V1*a*) of the first space 41. As a result, the dust collecting mechanism 30 generates the second negative pressure in the second space 42 that is greater than the first negative pressure generated in the first space 41 when the movable contact piece 8 moves from the closed position to the open position.

Similarly, as shown in FIG. 7, the volume of the third space 43 between the second fixed contact 11 and the second movable contact 13 when the movable contact piece 8 is disposed at the closed position is defined as V3*a*. The volume of the fourth space 44 between the third surface 35 and the fourth surface 37 when the movable contact piece 8 is at the closed position is defined as V4*a*. As shown in FIG. 8, the volume of the third space 43 between the second fixed contact 11 and the second movable contact 13 when the movable contact piece 8 is at the open position is defined as V3*b*. The volume of the fourth space 44 between the third surface 35 and the fourth surface 37 when the movable contact piece 8 is at the open position is defined as V4*b*. In this case, the following formula (2) holds.

$$V4b-V4a>V3b-V3a \quad (2)$$

That is, when the movable contact piece 8 moves from the closed position to the open position, the fourth volume change amount (V4*b*−V4*a*) of the fourth space 44 is greater than the third volume change amount (V3*b*−V3*a*) of the third space 43. As a result, the dust collecting mechanism 30 generates the fourth negative pressure in the fourth space 44 that is greater than the third negative pressure generated in the third space 43 when the movable contact piece 8 moves from the closed position to the open position.

In the electromagnetic relay 1 according to the present embodiment described above, the second negative pressure that is greater than the first negative pressure generated between the first fixed contact 10 and the first movable contact 12 is generated by the dust collecting mechanism 30 when the movable contact piece 8 moves from the closed position to the open position. Also, the fourth negative pressure that is greater than the third negative pressure generated between the second fixed contact 11 and the second movable contact 13 is generated. Therefore, air around the first fixed contact 10 and the first movable contact 12 is guided to the dust collecting mechanism 30. Also, air around the second fixed contact 11 and the second movable contact 13 is guided to the dust collecting mechanism 30. This prevents foreign matter contained in the air from adhering to the first and second movable contacts 12 and 13 or the first and second fixed contacts 10 and 11.

Although one embodiment of the present invention has been described above, the present invention is not limited to the above-described embodiment, and various modifications are possible without departing from the scope of the invention.

The electromagnetic relay 1 according to the above embodiment is a so-called plunger type electromagnetic relay. However, the electromagnetic relay 1 is not limited to the plunger type, and may be of another type such as a hinge type.

The structure of the drive device 4 is not limited to that of the above embodiment, and may be modified. For example, in the above embodiment, the drive device 4 is disposed in the open direction (Z2) of the contact device 3. However, the drive device 4 may also be disposed in the longitudinal direction (X1, X2) or the lateral direction (Y1, Y2) with respect to the contact device 3. The open direction (Z2) and the contact direction (Z1) may be directions opposite to those in the above embodiment.

The structure of the contact device 3 is not limited to that of the above embodiment, and may be modified. For example, the first fixed contact 10 may be provided separately from or integral with the first fixed terminal 6. The second fixed contact 11 may be provided separately from or integral with the second fixed terminal 7. The first movable contact 12 may be provided separately from or integral with the movable contact piece 8. The second movable contact 13 may be provided separately from or integral with the movable contact piece 8. The number of fixed contacts is not limited to two, and may be one or more than two. The number of movable contacts is not limited to two, and may be one or more than two.

Figure 9:
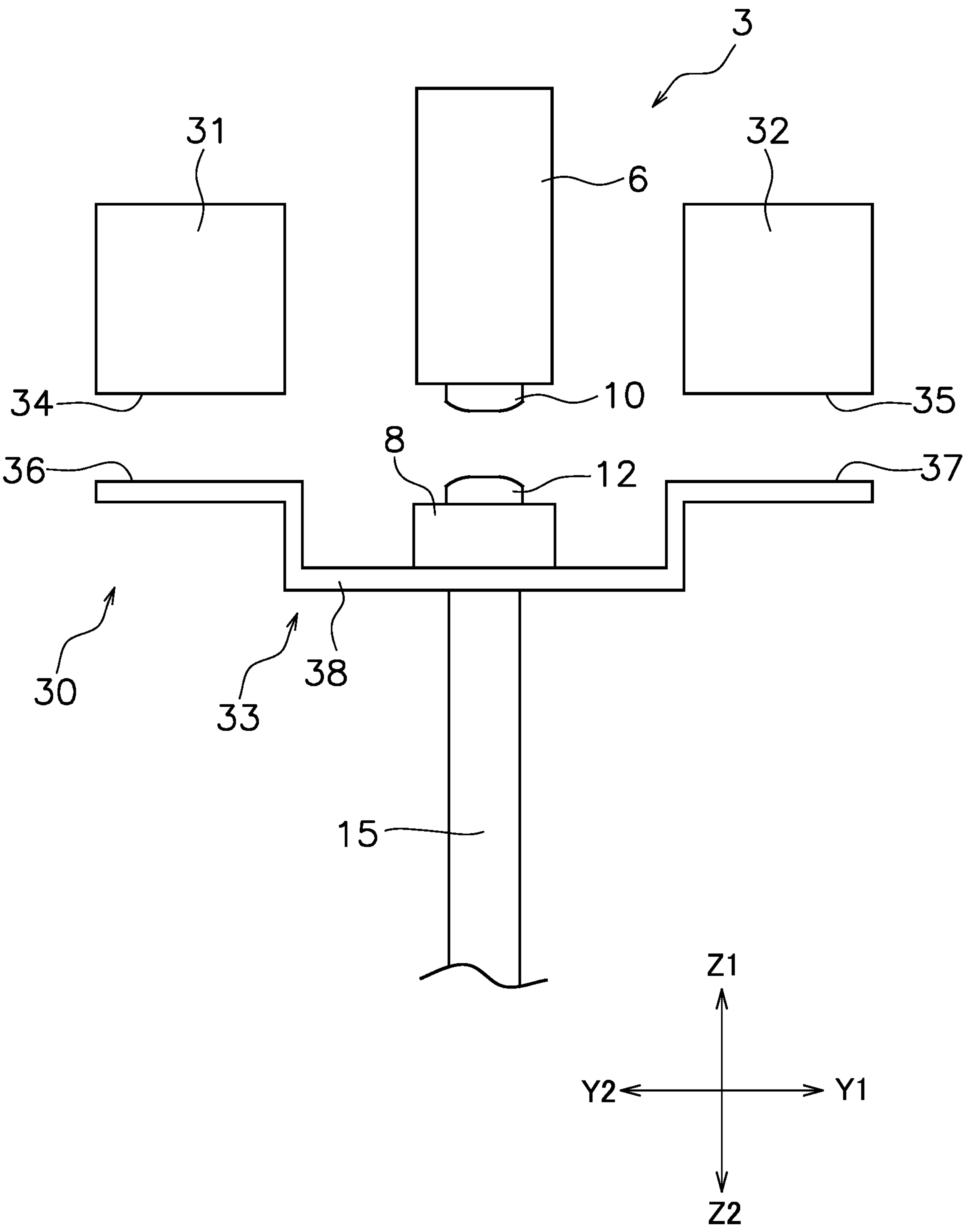
FIG. 9 is a diagram showing a contact device according to a first modified example.

The structure of the dust collecting mechanism 30 is not limited to that of the above embodiment, and may be modified. For example, in the above embodiments, the first surface 34 and the second surface 36, the third surface 35 and the fourth surface 37 are disposed in the longitudinal direction (X1, X2) with respect to the movable contact piece 8. However, as in a first modification shown in FIG. 9, the first surface 34 and the second surface 36, the third surface 35 and the fourth surface 37 may be disposed in the lateral direction (Y1, Y2) with respect to the movable contact piece 8.

Figure 10:
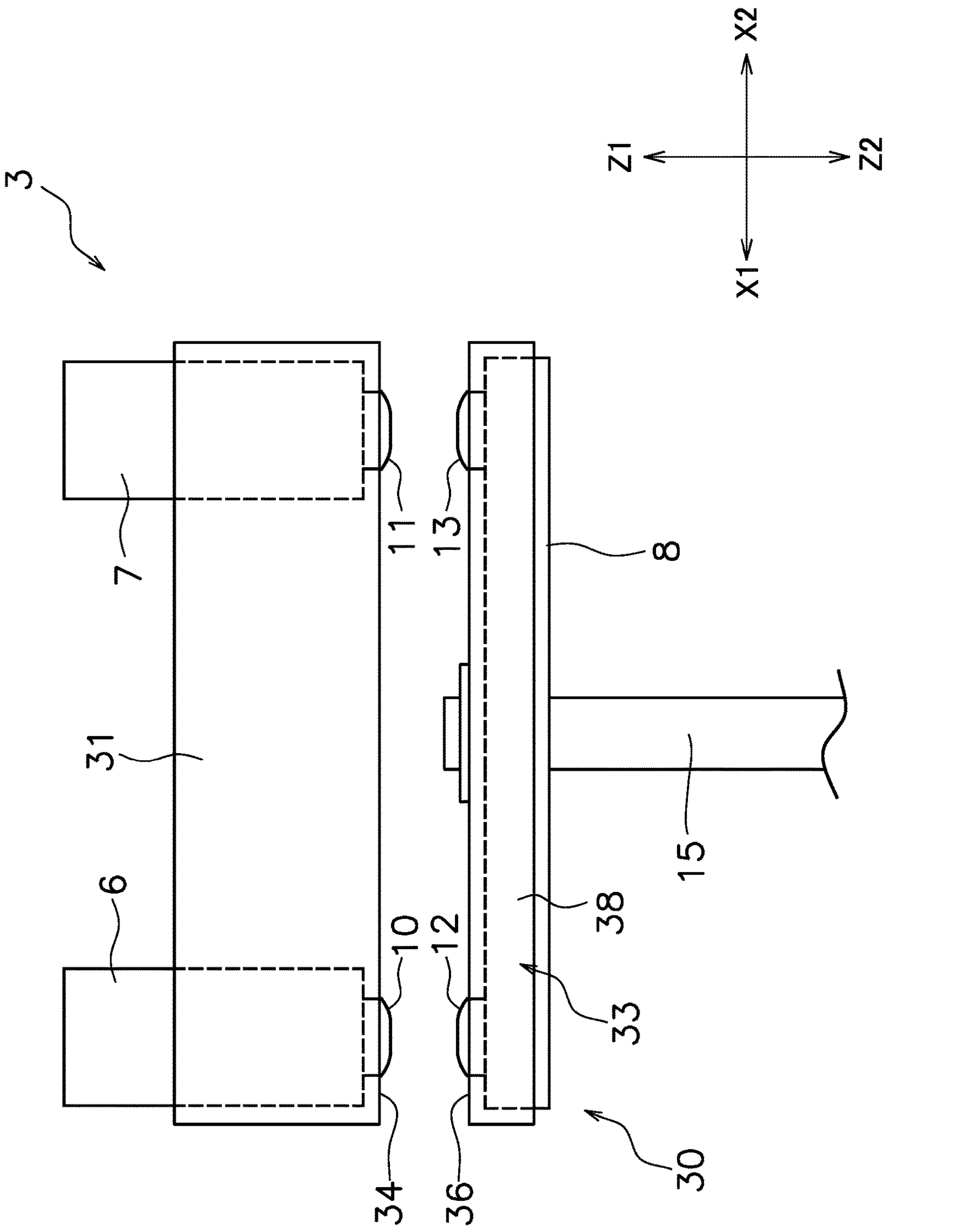
FIG. 10 is a diagram showing a contact device according to a second modified example.

In the above embodiments, the first and third surfaces 34 and 35 are disposed with respect to the first and second fixed contacts 10 and 11, respectively. Further, the second and fourth surfaces 36 and 37 are disposed with respect to the first and second movable contacts 12 and 13, respectively. However, as in a second modification shown in FIG. 10, the integral first surface 34 may be disposed with respect to the first and second fixed contacts 10 and 11. The integral second surface 36 may be disposed with respect to the first and second movable contacts 12 and 13.

In the above embodiments, the second surface 36 is not in contact with the first surface 34 and is spaced apart from the first surface 34 when the movable contact piece 8 is at the closed position. However, the second surface 36 may be in contact with the first surface 34 with the movable contact piece 8 at the closed position. In this case, at the same time when the first and second movable contacts 12 and 13 separate from the first and second fixed contacts 10 and 11, the second and fourth surfaces 36 and 37 may separate from the first and third surfaces 34 and 35.

Figure 11A:
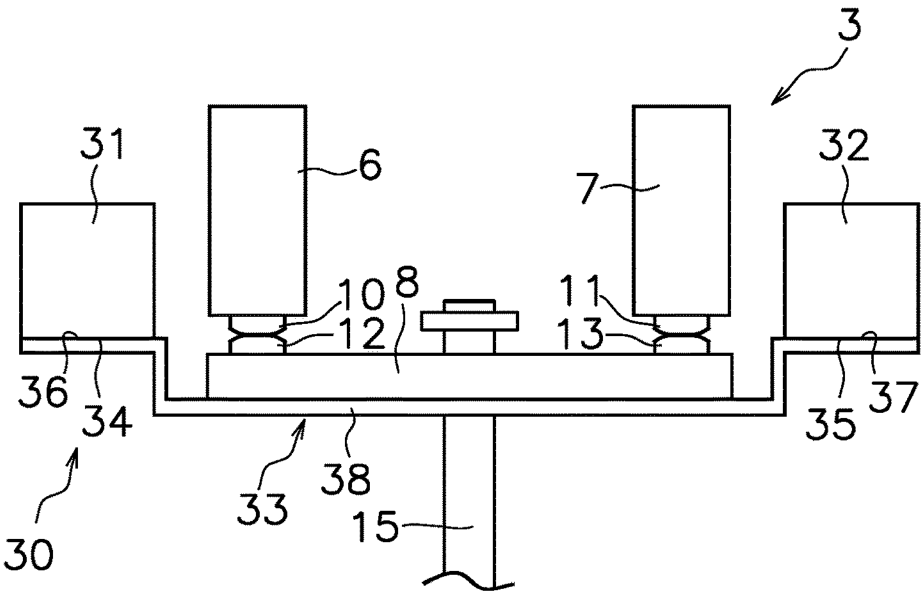
FIG. 11A is a diagram showing a contact device according to a third modified example.
Figure 11B:
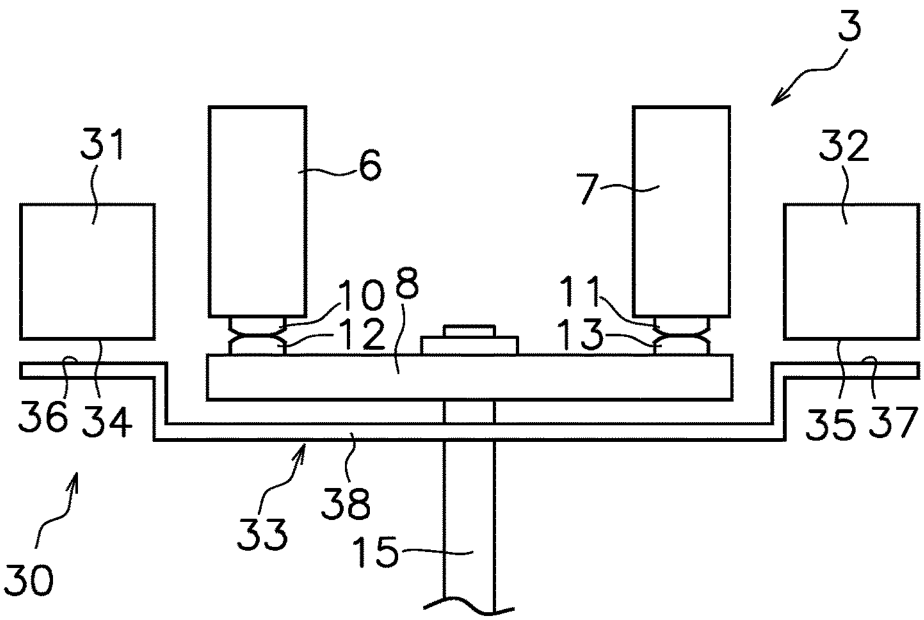
FIG. 11B is a diagram showing the contact device according to the third modified example.
Figure 11C:
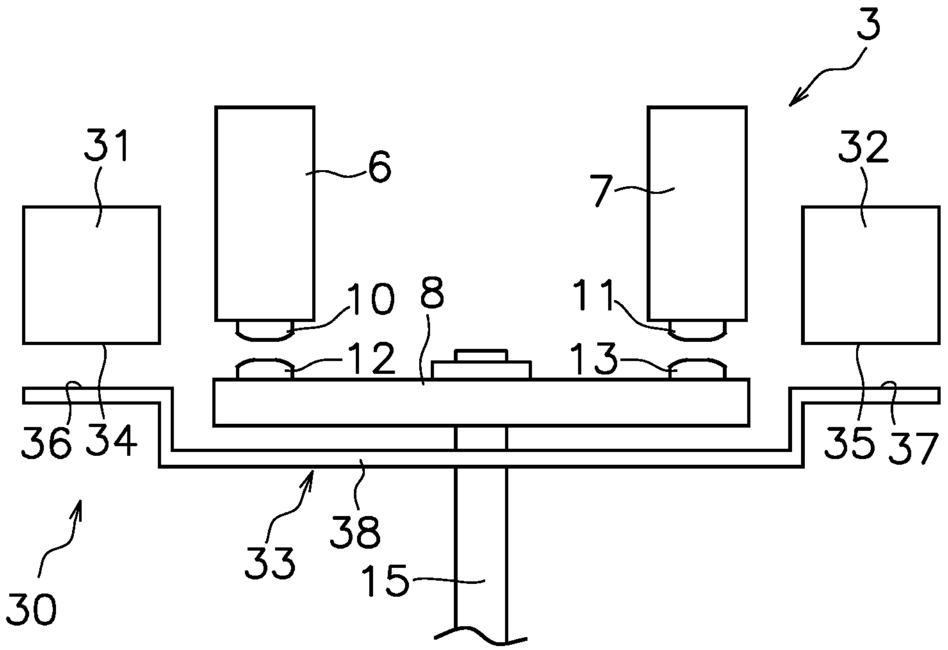
FIG. 11C is a diagram showing the contact device according to the third modified example.

Alternatively, the second and fourth surfaces 36 and 37 may separate from the first and third surfaces 34 and 35 before the first and second movable contacts 12 and 13 separate from the first and second fixed contacts 10 and 11. FIGS. 11A to 11C are diagrams showing a contact device 3 according to a third modified example. In FIG. 11A, the movable contact piece 8 is at the closed position, the second surface 36 is in contact with the first surface 34, and the fourth surface 37 is in contact with the third surface 35. When the drive shaft 15 moves in the open direction (Z2), as shown in FIG. 11B, the drive shaft 15 and the movable portion 33 move in the open direction (Z2) while the first and second movable contacts 12 and 13 remain in contact with the first and second fixed contacts 10 and 11. Thereby, the second and fourth surfaces 36 and 37 separate from the first and third surfaces 34 and 35. After that, when the drive shaft 15 moves further in the open direction (Z2) by the contact follow amount, the first and second movable contacts 12 and 13 separate from the first and second fixed contacts 10 and 11 as shown in FIG. 11C.

Figure 12A:
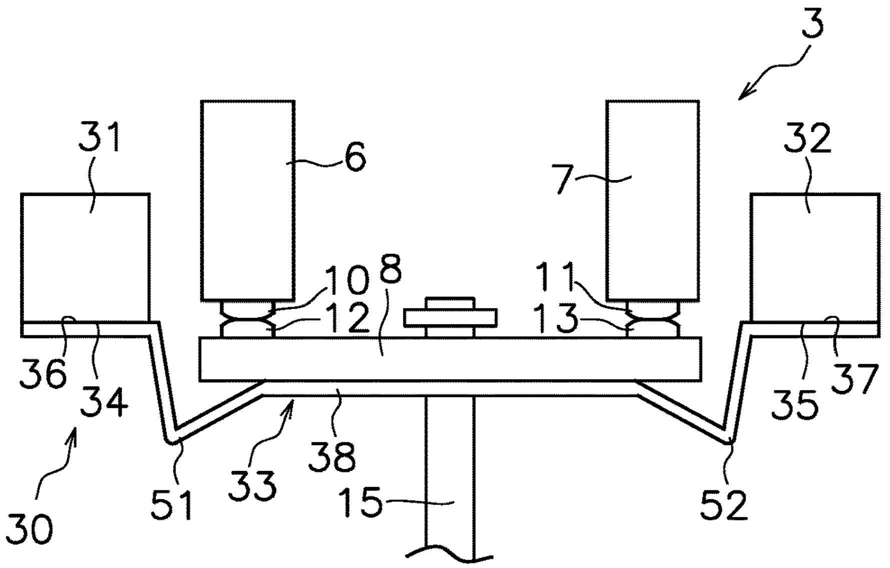
FIG. 12A is a diagram showing a contact device according to a fourth modification.
Figure 12B:
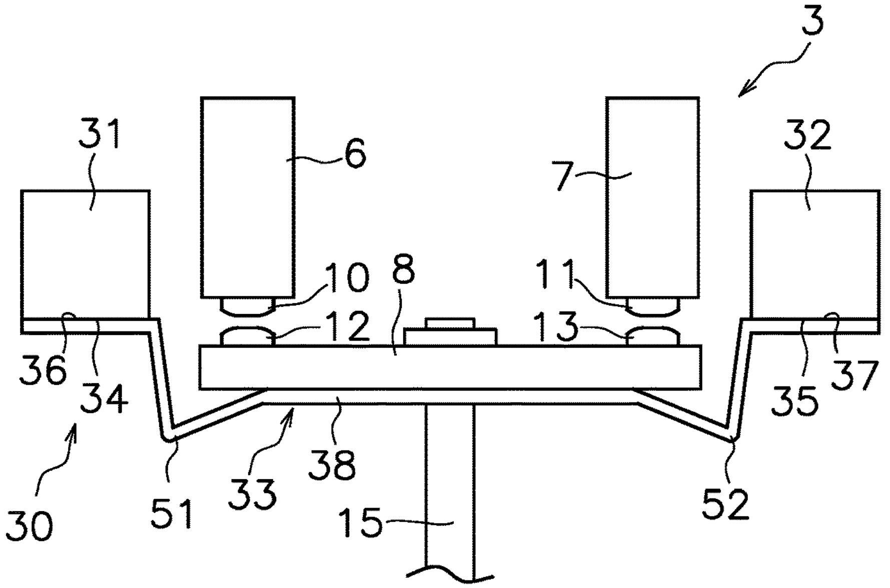
FIG. 12B is a diagram showing the contact device according to the fourth modification.
Figure 12C:
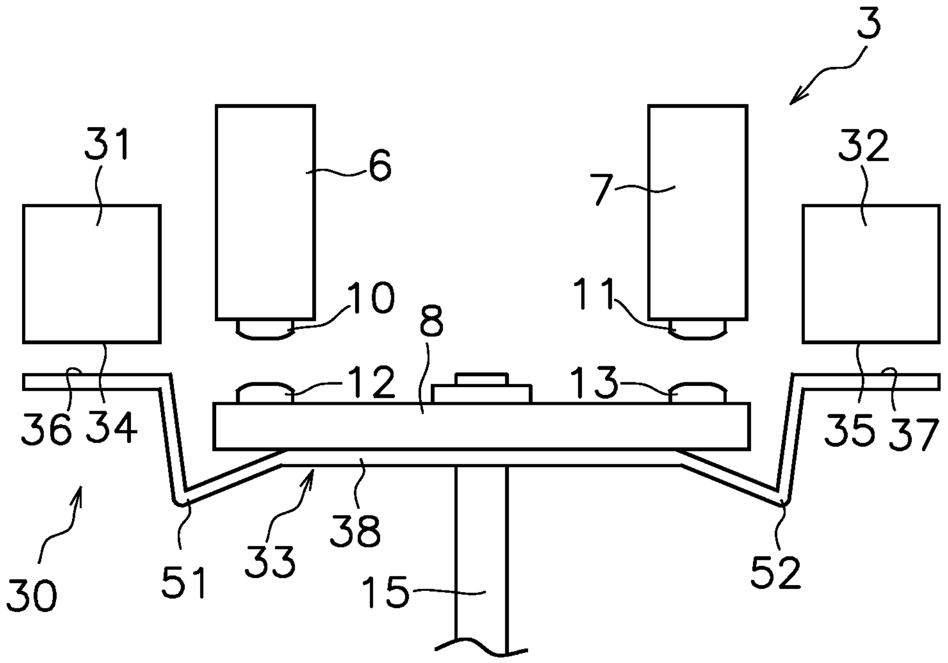
FIG. 12C is a diagram showing the contact device according to the fourth modification.

Alternatively, when the movable contact piece 8 moves from the closed position to the open position, after the first and second movable contacts 12 and 13 separate from the first and second fixed contacts 10 and 11, the second and fourth surfaces 36 and 37 may be separate from the first and third surfaces 34 and 35. FIGS. 12A to 12C are diagrams showing a contact device 3 according to a fourth modified example. As shown in FIGS. 12A to 12C, the support portion 38 includes a first elastic portion 51 and a second elastic portion 52. The first elastic portion 51 has springiness and supports the second surface 36. The second elastic portion 52 has springiness and supports the fourth surface 37.

In FIG. 12A, the movable contact piece 8 is at the closed position, the second surface 36 is in contact with the first surface 34, and the fourth surface 37 is in contact with the third surface 35. In this state, the first elastic portion 51 is elastically deformed and biases the second surface 36 toward the first surface 34. The second elastic portion 52 is elastically deformed and biases the fourth surface 37 toward the third surface 35. When the movable contact piece 8 moves in the open direction (Z2), the first and second movable contacts 12 and 13 separate from the first and second fixed contacts 10 and 11 as shown in FIG. 12B. In this state, the first elastic portion 51 biases the second surface 36 toward the first surface 34 and the second surface 36 is in contact with the first surface 34. Also, the second elastic portion 52 biases the fourth surface 37 toward the third surface 35, and the fourth surface 37 is in contact with the third surface 35. After that, when the movable contact piece 8 moves further in the open direction (Z2), the second surface 36 separates from the first surface 34 and the fourth surface 37 separates from the third surface 35, as shown in FIG. 12C.

Figure 13:
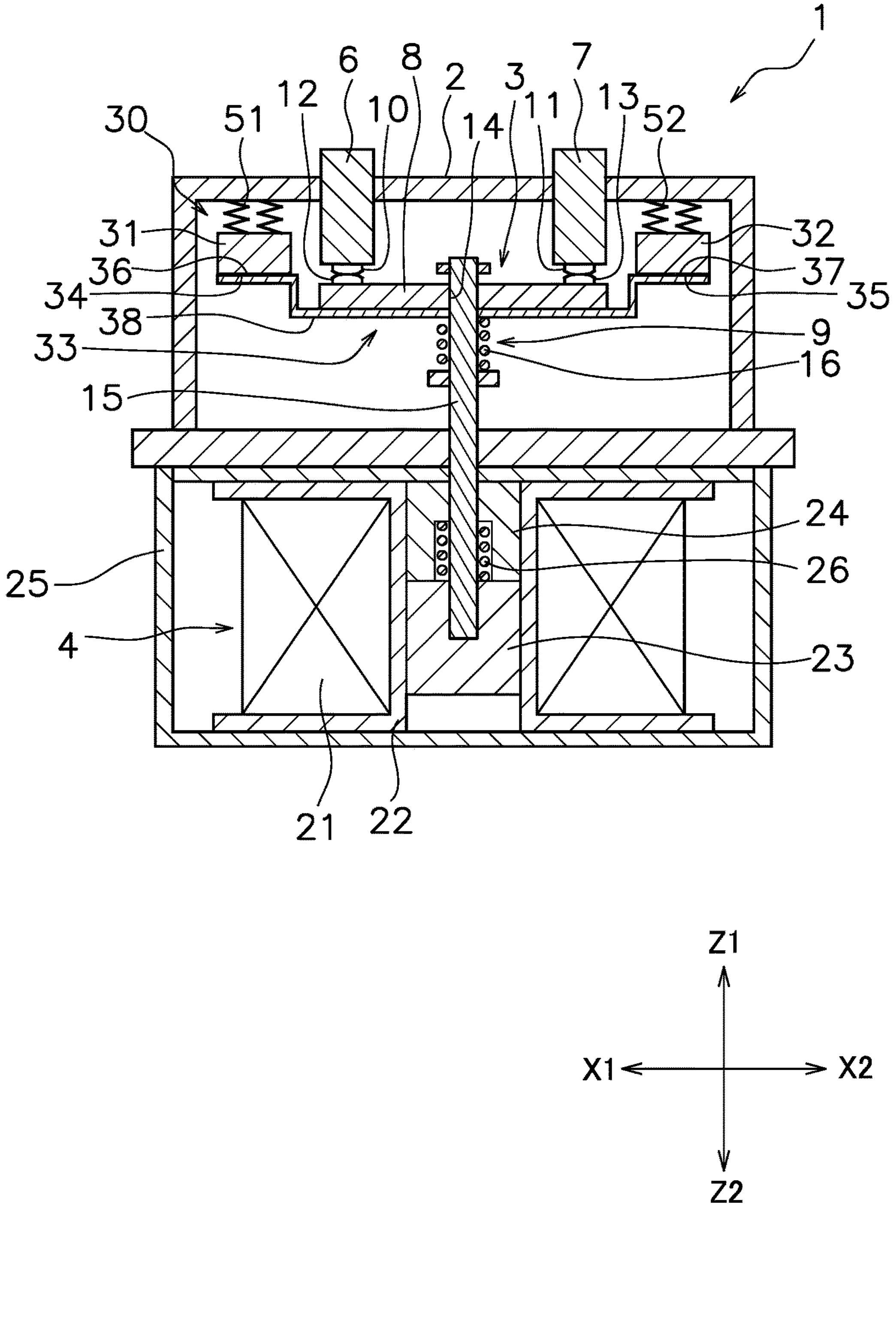
FIG. 13 is a cross-sectional view showing an electromagnetic relay according to a fifth modification.

The first elastic portion 51 and the second elastic portion 52 may be provided in the contact device 3 according to the above embodiment or the first to third modifications. FIG. 13 is a diagram showing an electromagnetic relay 1 according to a fifth modification. As shown in FIG. 13, the first elastic portion 51 and the second elastic portion 52 may support the first fixed portion 31 and the second fixed portion 32, respectively.

REFERENCE SIGNS LIST

6: First fixed terminal, 8: Movable contact piece, 10: First fixed contact, 12: First movable contact, 30: Dust collecting mechanism 31: First fixed portion, 33: Movable potion, 34: First surface, 36: Second surface

The invention claimed is:

1. An electromagnetic relay comprising:

a fixed terminal;

a fixed contact connected to the fixed terminal;

a movable contact facing the fixed contact;

a movable contact piece connected to the movable contact, the movable contact piece being movable between a closed position at which the movable contact is in contact with the fixed contact and an open position at which the movable contact is separated from the fixed contact; and a dust collecting mechanism disposed adjacent to the fixed contact and the movable contact, the dust collecting mechanism being configured to generate a second negative pressure greater than a first negative pressure generated between the fixed contact and the movable contact when the movable contact piece moves from the closed position to the open position.

2. The electromagnetic relay according to claim 1, wherein the dust collecting mechanism includes a fixed portion including a first surface, and a movable portion including a second surface facing the first surface, the movable portion being connected to the movable contact piece, and the electromagnetic relay is configured such that when the movable contact piece moves from the closed position to the open position, a second volume change amount of a second space between the first surface and the second surface is greater than a first volume change amount in a first space between the fixed contact and the movable contact.

3. The electromagnetic relay according to claim 2, wherein the first surface has a surface area greater than a surface area of the fixed contact.

4. The electromagnetic relay according to claim 2, wherein the second surface has a surface area greater than a surface area of the movable contact.

5. The electromagnetic relay according to claim 2, wherein the electromagnetic relay is configured such that when the movable contact piece moves from the closed position to the open position, the second surface separates from the first surface before the movable contact separates from the fixed contact.

6. The electromagnetic relay according to claim 2, wherein the electromagnetic relay is configured such that when the movable contact piece moves from the closed position to the open position, the second surface separates from the first surface after the movable contact separates from the fixed contact.

7. The electromagnetic relay according to claim 2, wherein the fixed portion is supported by an elastic member.

8. The electromagnetic relay according to claim 2, wherein the movable portion is supported by an elastic member.

* * * * *